United States Patent [19]

Schoonover et al.

[11] Patent Number: 4,623,002
[45] Date of Patent: Nov. 18, 1986

[54] POLYMER CONTROL VALVE

[75] Inventors: Kevin G. Schoonover, Atlanta; Donald S. Sanders, Norcross, both of Ga.

[73] Assignee: Steam Systems and Services Incorporated, Atlanta, Ga.

[21] Appl. No.: 715,630

[22] Filed: Mar. 25, 1985

[51] Int. Cl.⁴ .................. F16K 49/00; F16K 11/044; F16K 1/06
[52] U.S. Cl. .............................. 137/625.48; 137/340; 251/118; 251/366
[58] Field of Search .......... 137/625.48, 625.5, 625.27; 251/118, 366

[56] References Cited

U.S. PATENT DOCUMENTS

| 916,403 | 3/1909 | Adamson | 137/625.5 |
| 3,123,091 | 3/1964 | Elsey | 137/625.5 X |
| 3,771,562 | 11/1973 | Curran | 137/625.48 X |
| 4,522,221 | 6/1985 | Chivens et al. | 137/625.5 X |

FOREIGN PATENT DOCUMENTS 0163776 10/1982 Japan .............................. 137/625.48

Primary Examiner—Arnold Rosenthal
Attorney, Agent, or Firm—Jones & Askew

[57] ABSTRACT

A valve for controlling or diverting the flow of relatively viscous flowable materials such as polymers or the like. The valve includes a valve plug mounted for longitudinal movement within a valve chamber which receives the flowable material. A pair of antechambers flank the valve chamber, and a pair of portals connect the valve chamber with each antechamber. The valve plug selectably blocks one or the other of these portals, depending on the longitudinal position of the valve plug. A wall of each antechamber is angled to divert incoming flowable material toward the outflow passages individually leading away from the antechambers.

4 Claims, 6 Drawing Figures

POLYMER CONTROL VALVE

FIELD OF THE INVENTION

This invention relates in general to control valves, and in particular relates to valves for controlling the flow of relatively viscous flowable materials such as polymers or the like.

BACKGROUND OF THE INVENTION

Controlling or diverting the flow of relatively viscous flowable materials presents problems not typically encountered when dealing with more flowable liquids. Typical examples of such viscous materials include various polymer resins and high-viscosity fibrous flowable materials, having viscosities typically in the range of 30,000 to 300,000 centipoise. The interior surfaces of valves and other flow elements must be especially smooth to reduce frictional drag at the boundary layer of the flowing material, and the valves should lack any dead spaces where the flowable material could collect and harden, and degrade.

These problems and considerations are particularly relevant in flow control valves, which divert the flow of viscous material from a normal process stream to an alternative flow path. This flow diversion may take place, for example, in polymer systems where the system is periodically cleaned by injecting a solvent upstream of various process elements, to clean the valves and conduits and remove accretions of the viscous material therein. When a solvent is injected in a flow line upstream of a process stage, the normal flow must be diverted to avoid contaminating the downstream process with the solvent or solvent-polymer mixture. It is particularly important that the wetted surfaces of such control valves be smooth and devoid of any dead spaces where polymer or other viscous material buildup can occur, regardless of valve position. Because the wetted surfaces within the valve must be polished to attain the desired level of smoothness, conventional valve design and fabrication has been less than satisfactory.

SUMMARY OF INVENTION

Stated in general terms, the polymer control valve of the present invention includes a valve body through which the inflow and outflow passages for viscous materials or the like are formed. The passages join a flow control region within the valve body, and the movable valve element is located in the flow control region for reciprocating movement in connection with the flow control function of the valve. The flow control region itself is located in cylindrical passages formed in the valve body. One or more insert members of cylindrical exterior shape are removably fitted in these bores, in material flow communication with the inflow and outflow passages through the valve body. The interior surfaces of the insert members comprise the wetted portions of the valve assembly, and these interior portions can be relatively easily and economically polished to the necessary smoothness before assembly into the valve body. The total wetted surfaces of the valve thus can largely or entirely consist of cylindrical or flat surfaces, either in the valve body itself or in removable inserts therein, which are relatively accessible for polishing or honing without resort to expensive specialpurpose tools or hand-polishing techniques.

Stated somewhat more particularly, the present flow control valve includes a flow control plug member mounted for limited reciprocating movement within the valve chamber formed in the body of the valve. A control rod attaches to this valve plug and extends outwardly from the valve chamber to a suitable linear actuating mechanism. The valve plug thus selectably contacts a valve seat surrounding one or more orifices within the valve body, diverting or otherwise controlling the flow of relatively viscous material therethrough. Where the viscous material must undergo a substantial change in direction of flow when leaving the valve chamber, angled surfaces redirect the flow and thereby avoid flow stagnation or dead regions within the valve.

Referring specifically to a flow diverting embodiment of the present valve, the valve plug is axially movable within a valve chamber which is flanked by separate antechambers coaxially aligned with the valve chamber and the movable valve plug. The valve chamber is connected to the antechambers by separate portals, and a valve seat is associated with each portal. The valve plug has separate valve surfaces for mating engagement with the two valve seats, so that the valve plug seals either one or the other of these portals depending on the position of the valve plug.

Viscous material is conducted to the valve chamber by an inflow passage, and a pair of outflow passages separately lead from the two antechambers. The position of the valve plug within the valve chamber thus determines the flow path from the inflow passage to either of the outflow passages.

Accordingly, it is an object of the present invention to provide an improved flow control valve particularly useful for relatively viscous materials.

It is another object of the present invention to provide a viscous material flow control valve of relatively economical and easy construction.

It is still another object of the present invention to provide a flow control valve for diverting the flow of relatively viscous materials between two possible outflow paths.

Other objects and advantages of the present invention will become more readily apparent from the following description of a preferred embodiment.

DESCRIPTION OF PREFERRED EMBODIMENT

Figure 1:
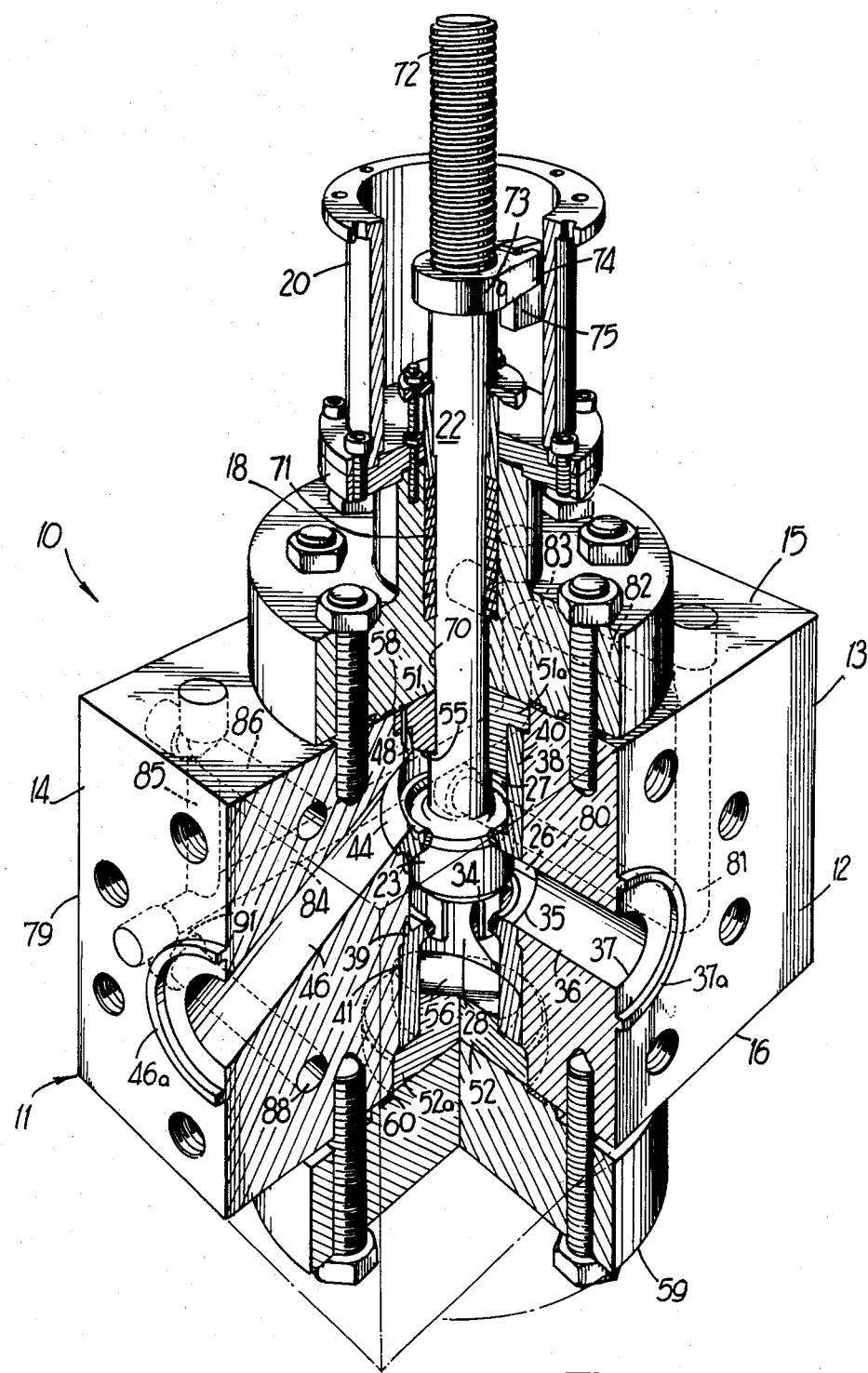
FIG. 1 is a pictorial view, shown partially cut away for illustrative purposes, of a flow diverting valve according to a disclosed embodiment of the present invention.
Figure 2:
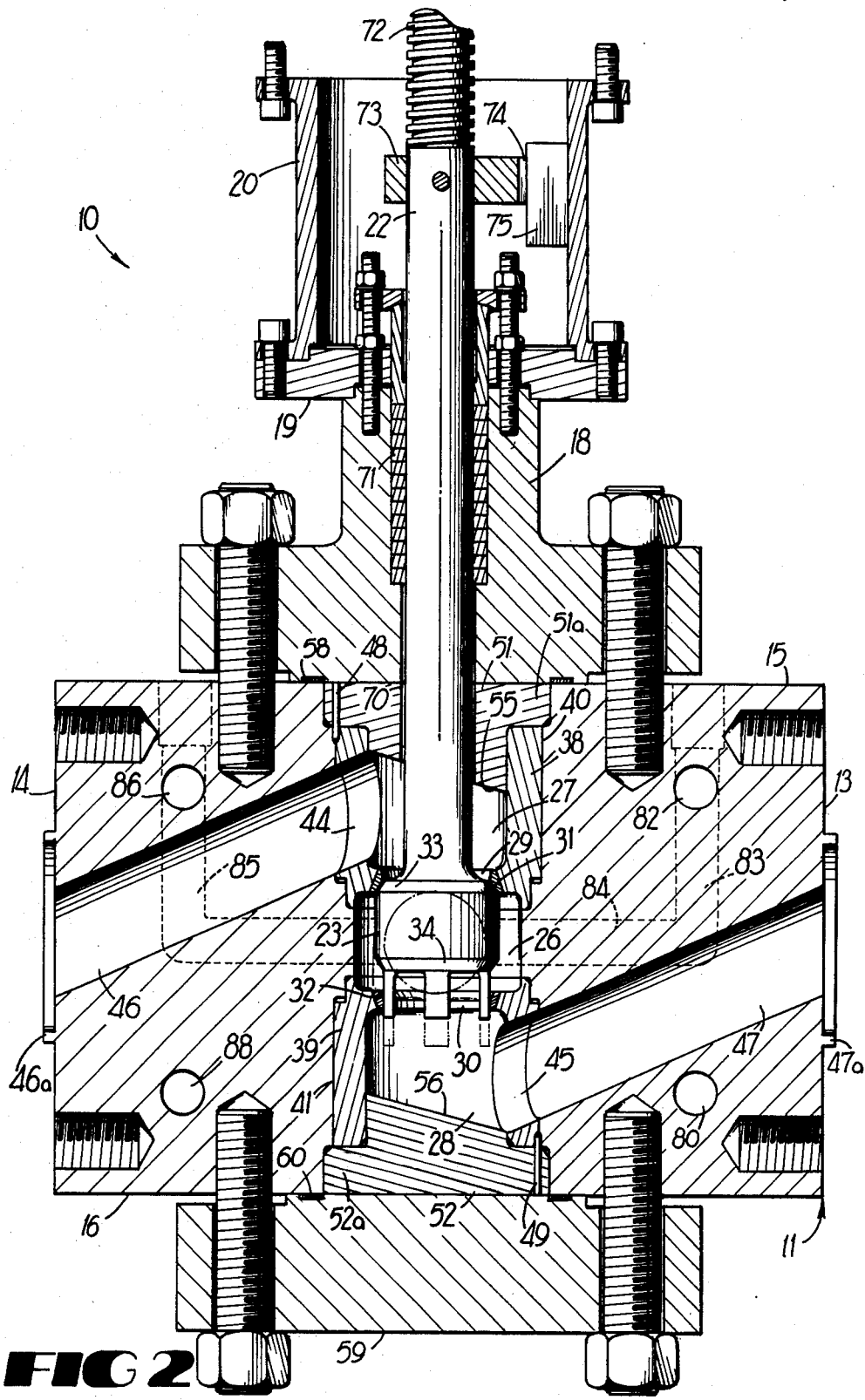
FIG. 2 is a vertical section view of the valve shown in FIG. 1.
Figure 3:
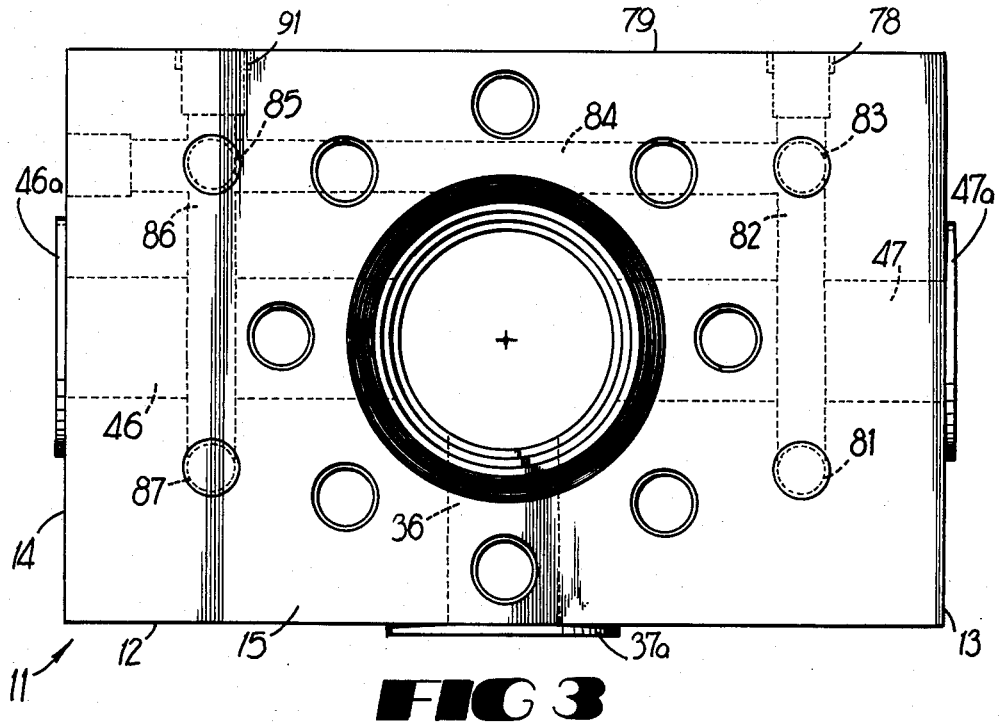
FIG. 3 is a top plan view, with certain fluid passages shown by hidden lines, of the valve body for the disclosed embodiment.
Figure 4:
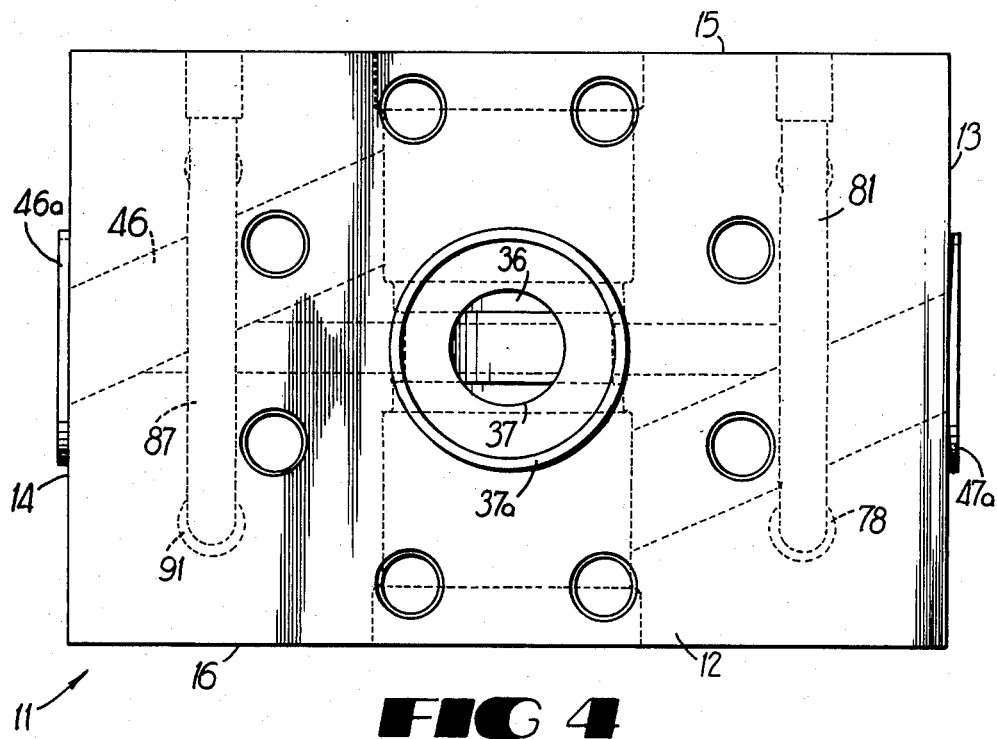
FIG. 4 is a front elevation view of the valve body, with certain fluid passages shown by hidden lines.

Turning first to FIGS. 1 and 2, there is shown generally at 10 a polymer diverting valve including a valve body 11 having a front side 12, a right side 13, a left side 14, a top 15, and a bottom 16. A bonnet flange 18 is bolted to the top 15 of the valve body, and a bonnet flange extension 19 in turn is bolted to the top of the bonnet flange, although this extension alternatively can be fabricated as an integral portion of the bonnet flange itself. An actuator mounting housing 20 is fastened to the top of the bonnet flange extension 19, and a suitable actuator mechanism (not shown) is fastened to the upper end of the actuator mounting housing. The actuator may be of conventional construction, and may be either manually or power actuated to impart linear nonrotating movement in either direction to the operating rod 22 extending to the valve plug 23 located within the valve body 11.

The valve body 11 preferably is machined from a unitary metallic member and has an internal valve chamber 26 located intermediate the top 15 and bottom 16 of the valve body. Located on each side of the valve chamber 26 are a pair of antechambers 27 and 28, communicating with the valve chamber by respective portals 29 and 30. Each valve portal includes a coaxial valve seat 31 and 32, respectively, each seat defining a beveled surface selectively mating with the facing beveled surfaces 33 and 34 on opposite confronting ends of the cylindrical valve plug 23. Referring particularly to FIG. 2, it will be seen that the upper valve plug surface 33 seats on the valve seat 31 of the upper portal 29, when the valve plug 23 is in the upper position depicted in that figure. When the valve plug 23 is lowered, the previously-open lower portal 30 is closed as the valve plug surface 34 at the lower end of the valve plug 23 moves into contact with the valve seat 32. The position of the valve plug 23 thus selects either the upper antechamber 27 or the lower antechamber 28 for flow communication with the valve chamber 26.

An inlet portal 35 interrupts the cylindrical wall of the valve chamber 26. The inlet portal 35 communicates with the inflow passage 36, FIG. 1, extending horizontally to the inlet opening 37 formed in the front wall 12 of the valve body 11. This inlet opening 37 is surrounded by a connecting flange 37a machined into the front wall 12 of the valve body, to facilitate connecting the inlet opening to suitable conduit or the like. Similar connecting flanges 47a and 46a are formed in the right and left sides 13 and 14, at the outlets of the outflow passages 47 and 46.

Each of the antechambers 27 and 28 is formed by respective seat sleeves 38 and 39, which preferably are fabricated separate from the valve body 11 and are subsequently assembled in the valve body. Each sleeve 38 and 39 preferably has a cylindrical outer surface 40, 41 which snugly fits within corresponding cylindrical openings bored in the top 15 and bottom 16 of the valve body 11. These bores for receiving the sleeves 38 and 39 are of somewhat greater diameter than the valve chamber 26, which also preferably is cylindrical and formed by boring the valve body. Thus, the valve chamber 26 and the bores for receiving the two sleeves 38, 39 are coaxial and are achieved by straightforward boring operations conducted from the top and bottom of the valve body.

Each seat sleeve 38 and 39 has a cylindrical inner surface defining the walls of the antechambers 27 and 28, and these cylindrical surfaces preferably are polished or honed to the desired degree of smoothness needed to augment the flow of viscous material therethrough. Again, because the seat sleeves 38 and 39 preferably are manufactured as separate parts and because the antechambers 27, 28 are simple cylindrical surfaces, this polishing or honing is accomplished with relative ease and economy.

The cylindrical annular wall of each sleeve 38, 39 is interrupted by the respective outlet ports 44, 45, which in turn are aligned with the outflow passages 46 and 47 extending through the valve body 11 to terminate at the respective left side 14 and right side 13 of the valve body. The outflow passages 46 and 47 of the disclosed embodiment each form an acute angle with the longitudinal axis of the valve chamber 26 and the two antechambers 27, 28; the outlet ports 44 and 45 in the sleeves 38 and 39 likewise are acutely angled and thus form a continuation of the respective outflow passages 46, 47. These outflow passages are bored into the valve body from the left and right sides thereof, and the outlet ports 44 and 45 similarly are bored through the annular cylindrical wall of the sleeves 38, 39. The use of an acute angle for the passages 46 and 47 depends on factors including the flowability of the material passing through a particular valve, and right-angled passages have been used on valves according to the present invention.

In many applications of valves according to the present invention, a further economy of fabrication may be possible by making the seat sleeves 38 and 39 identical and interchangeable with each other. This illustrated in FIG. 2, where it can be seen that the upper seat sleeve 38 is structurally identical with the lower seat sleeve 39; only the spatial location and angular orientation of the two sleeves is different, in the disclosed embodiment. Cylindrical locking pins 48 and 49 engage mating apertures in the outer end surface of each seat sleeve 38, 39, thereby angularly orienting each seat sleeve with its respective outlet port 44 or 45 aligned with the outflow passages 46, 47.

The sleeves 38 and 39 are held in place in the valve body 11 by the top deflector 51 and bottom deflector 52. Each deflector 51, 52 has an outer portion 51a, 52a which snugly fits within the outer end of the respective bore for receiving the seat sleeves 38 and 39. The inner radial surfaces of the deflector outer portions 51a, 52a abut the top radial surfaces of the sleeves 38, 39, holding the sleeves firmly in place within their respective bores. The upper ends of the previously-mentioned locking pins 48 and 49 extend in mating holes formed in the outer portions 51a, 52a, maintaining the proper angular positions of the deflectors 51 and 52 relative to the sleeves 38 and 39.

The inner ends of the top deflector 51 and bottom deflector 52 are reduced in diameter to fit snugly within the open outer ends of the cylindrical antechambers 27 and 28. These inner ends of the top and bottom deflectors terminate in deflecting surfaces 55, 56 each aligned at an oblique angle relative to the longitudinal axis extending through the antechambers and the valve chamber 26. As best seen in FIG. 2, the oblique angle and circular orientation of the deflecting surfaces 55, 56 places each such surface in generally confronting relation with the respective outlet ports 44, 45 and the outflow passages 46, 47, and assists the flow of viscous material to the outlet ports from the valve antechambers 27, 28. The oblique angle formed by each deflecting surface 55, 56 need not be the identical reflection of the angular alignment for the outlet ports and outflow passages.

The top deflector 51 is held in place by the lower radial face of the bonnet flange 18. A suitable gasket 58 fits in an annular channel formed in the lower face of the upper bonnet flange. The bottom deflector 52 is held in place by the underlying lower flange 59 bolted to the bottom 16 of the valve body 11. A gasket 60 in a radial groove surrounding the outer portion 52a of the bottom deflector provides a seal therearound.

Figure 6:
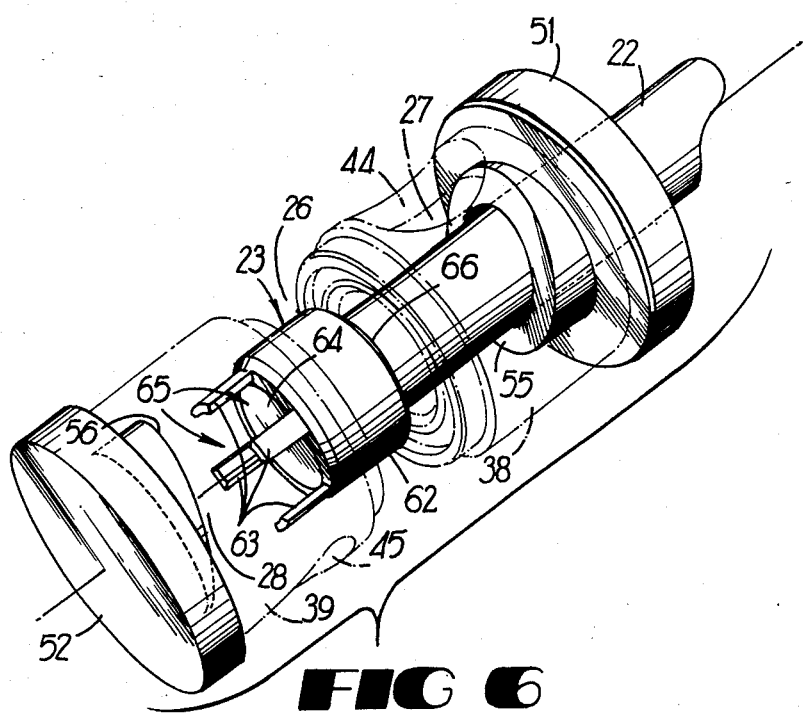
FIG. 6 is a pictorial view showing details of the valve plug in the disclosed embodiment.

Details of the valve plug 23 are best seen in FIG. 6. The main body 62 of the valve plug is cylindrical, having a diameter less than that of the valve chamber 26 so as not to entirely occupy the volume of the valve chamber. The upper and lower edges of the main body 62 are beveled to form the valve surfaces 33 and 34, previously mentioned, providing a mating fit to the confronting valve seats 31 and 32 at the inner ends of the seat sleeves 38 and 39.

A plurality of guide fingers 63 extend longitudinally out from the solid radial bottom end 64 of the main body 62. The guide fingers 63 are uniformly located on a circular path just inside the beveled valve surface 34, so that the outermost surfaces of the guide fingers provide a sliding and guiding fit through and within the valve seat 32, as best seen in FIG. 2. The open spaces 65 between adjacent guide fingers 63 function as material flow ports, as described below.

Extending longitudinally out from the top end 66 of the main body 62 is the operating rod 22 for the valve plug 23. This operating rod freely passes through the axial opening 70 in the top deflector 51, FIG. 2, and continues upwardly through an aligned axial opening formed in the bonnet flange 18. A number of packing glands 71 surround the operating rod 22 within the bonnet flange 18, providing a pressure and fluid-tight seal to the valve. The uppermost end 72 of the operating rod 22 is threaded to engage a rotating nut or similar element incorporated in the actuator 21, so as to impart longitudinal movement to the operating rod. A locking plate 73, pinned to the operating rod 22 within the housing 20, prevents the operating rod from rotating. The forked outer end 74 of the locking plate 73 slidably fits around the guide rib 75 fixed to the inside of the housing 20. The locking plate 73 thus is freely slidable in a longitudinal path relative to the guide rib 75, permitting the operating rod 22 to undergo longitudinal movement but blocking attempted rotation thereof.

The valve body 11 is equipped with internal heating passages to conduct heating fluid through the valve body. These heating passages commence at the inlet port 78 located on the back side 79 of the valve body 11, the first internal passage 80 extending within the valve body 11 from the back side 79 toward the front side 12 and joining the vertical second passage 81 within the valve body, and thence upwardly to join the horizontal third passage 82 extending rearwardly within the valve body toward the back side thereof. As best seen in FIG. 2, the horizontal first and third passages 80 and 82 extend respectively below and above the outflow passage 47.

Figure 5:
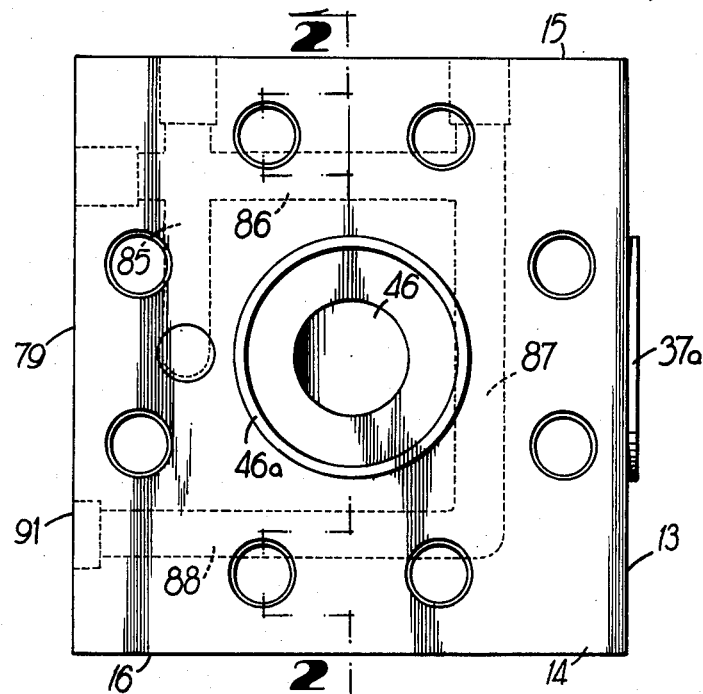
FIG. 5 is a left side view of the valve body shown in FIG. 3, with certain fluid passages shown by hidden lines.

The back end of the third passage 82 joins the upper end of the riser passage 83 extending vertically down within the valve body 11 to join the horizontal cross passage 84 running behind the valve chamber 23, as seen in FIG. 2. The left end of the cross flow passage 84 connects with the lower end of the vertical rise 85, which extends up to join the fourth passage 86 extending forward horizontally toward the front of the valve body 11. The fourth passage 86 thus is the counterpart of the third passage 82. The forward end of the fourth passage 86 connects with the upper end of a fifth passage 87, FIG. 5, extending vertically downwardly in the valve body and thus the counterpart of the second passage 81. The lower end of the fifth passage 87 joins the front end of the sixth passage 88, which extends back to the outlet port 91 in the back side 79 of the valve body. Again referring to FIG. 2, the fourth passage 86 and sixth passage 88 flank the outflow passage 46.

It will thus be understood that the several heating fluid passages form an extended loop through the valve body, and this loop conducts heating fluid on both sides of the outflow passages 46 and 47 as well as adjacent the valve chamber 26. With this arrangement, the valve body 11 is internally heated with fluid from an external source, without resort to separate jacketing or other external heating arrangements common in valves of the prior art.

The operation of the disclosed embodiment should now become apparent from the preceeding description. In a typical application of the valve 10, the inlet opening 37 is connected to receive an upstream flow of relatively viscous material. The outflow passage 47 is connected to a downstream process which normally receives the viscous material. The other outflow passage 46 may be connected to a suitable waste dump, or to another downstream process which can utilize the viscous material entering the valve 10. While the valve plug 23 is in the raised position shown in FIGS. 1 and 2, viscous material enters the valve chamber 26 through the inlet portal 35 and from there flows to the lower antechamber 28. This flow passes through the lower valve seat 32, extending through the flow ports 65 at the bottom end of the main body 62 on the valve plug 23. Viscous flow contacts the deflecting surface 56 of the bottom deflector 52, and this deflecting surface guides the viscous flow in changing direction toward the outlet port 45 and the outflow passage 47. The smooth surfaces and absence of any dead space in the valve chamber 26 or the antechamber 28 helps prevent the viscous material from accumulating therein.

When it is desired to divert the flow of viscous material, for example, if a solvent is being introduced upstream from the valve inlet opening 37, the operating rod 22 is lowered to place the lower valve surface 34 of the valve plug 23 into mating engagement with the lower valve seat 32. The sliding contact between the valve seat 32 and the guide fingers 63 of the valve plug 23 help maintain the concentricity and axial alignment of the valve plug 23 in moving from the upper to lower positions, as well as when in the upper position. The flow of viscous material entering the valve chamber 26 through the inlet portal 35 now is diverted, this flow during the upper antechamber 27 through the now-open upper portal 29. The viscous flow contacts the angled deflecting surface 55 of the top deflector 51, thereby changing direction toward the outlet port 44 and the aligned outflow passage 46.

It will thus be seen that the present control valve is relatively easy and inexpensive to manufacture, the finishing of the valve body being accomplished largely through steps such as boring and drilling. The wetted surfaces of the valve, with the exception of the cylindrical wall defining the valve chamber 26, are in the sleeves 38, 39 and the deflectors 51, 52, which are separately and easily machined and polished before assembly into the valve body 11. Furthermore, this construction of the valve facilitates tear down for maintenance and repair, inasmuch as all components are easily removable from the valve body 11 for inspection and possible replacement.

It will also be apparent that the foregoing relates only to a preferred embodiment of the present invention, and that numerous changes and modifications may be made therein without departing from the spirit or scope of the invention as defined in the following claims.

We claim:

1. A flow control valve for viscous flowable material, comprising:

a valve body;

a valve passage within said valve body, said valve passage being cylindrical and having an axis extending between first and second terminal ends in the valve body;

flow deflecting planar surfaces intersecting said cylindrical valve passage at said first and second ends, each said planar surface being at an oblique angle relative to said axis of the cylindrical valve passage;

valve means in said valve passage between said flow deflecting surfaces and operative to selectively block the valve passage; and first and second outflow passages formed in said valve body and extending to inner ends respectively intersecting said cylindrical valve passage contiguous to said first and second ends and forming flow ports confronting said oblique flow deflecting planar surfaces obliquely intersecting the valve passage at the first and second ends, whereby viscous material flowing in one outflow passage enters the valve passage through one of said flow ports and there flows into contact with the oblique flow deflecting planar surface confronting the flow port so that the oblique surface deflects the flow of viscous material to change direction from the one outflow passage to the axis of the valve passage, the viscous material then flowing to said valve means and selectively flowing past the valve means to contact the obliquely-angled flow deflecting planar surface confronting the other said flow port, whereat the flow of viscous material changes direction from the valve passage to enter the other outflow passage.

2. The valve as in claim 1, wherein said valve means comprises:

a valve member movable within said cylindrical valve passage; and an actuating rod connected to move said valve member and extending coaxially in said valve passage through an opening formed in one of said flow deflecting planar surfaces so that part of the actuating rod is acessible from outside the valve passage, whereby said actuating rod can be manipulated from outside the valve passage to operate the valve means without any flow receiving volume of the flow passage extending beyond said one deflecting surface, so that the flow of viscous material in the cylindrical valve passage is confined to the axial extent between said oblique planar surfaces intersecting the valve passage.

3. The valve as in claim 1, wherein:

said intersecting planar surfaces each adjoin said confronting flow ports, so that the planar surfaces and the corresponding adjoining outflow passages comprise contiguous surfaces for guiding the flow of viscous material to and from the valve pasage.

4. The valve as in claim 1, wherein:

the outflow passage at each end of said cylindrical valve passage has an axis intersecting the cylindrical valve passage at an acute angle to said axis of the valve passage, as seen from the other end of the valve passage, so that the axes of said outflow passages are substantially reflected to the axis of the valve passage by the obliquely-angled planar surfaces, thereby aiding the deflection of flow of the viscous material through the valve.

* * * * *